Figure 1:
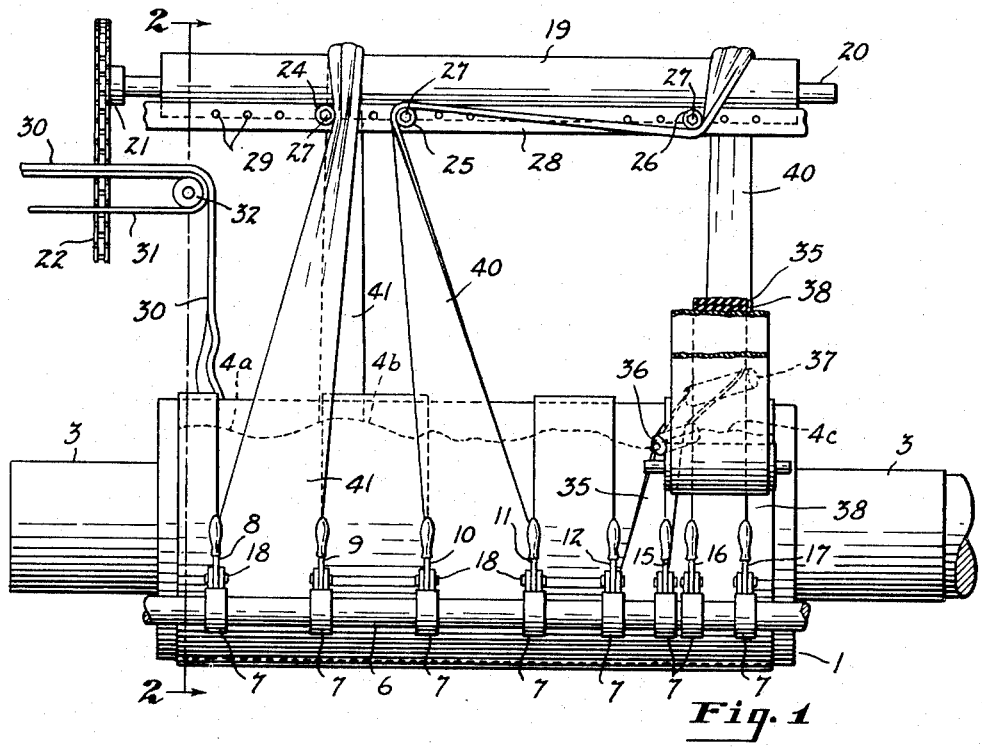

April 15, 1952 M. ENGLER 2,593,282
APPARATUS FOR MIXING RUBBER AND THE LIKE
Filed Oct. 18, 1950

INVENTOR.
Max Engler
BY
Evans & McCoy
ATTORNEYS

Patented Apr. 15, 1952

2,593,282

UNITED STATES PATENT OFFICE 2,593,282

APPARATUS FOR MIXING RUBBER AND THE LIKE

Max Engler, Akron, Ohio, assignor to The General Tire & Rubber Company, Akron, Ohio, a corporation of Ohio Original application May 23, 1946, Serial No. 671,684. Divided and this application October 18, 1950, Serial No. 190,690

1 Claim. (Cl. 18—2)

This invention relates to an improved apparatus for mixing rubber and rubberlike materials and more particularly to an apparatus for continuous milling and supplying in strip form of such materials.

It is customary in the rubber and plastics industry to employ parallel mill rolls for mixing and masticating rubber and various compounding materials, the word "rubber" being used in its generic sense to indicate various rubberlike compounds which may or may not contain natural rubber. Compounding of rubber and the like on mill rolls may be done by the batch method, an operator mixing together on conventional mill rolls the appropriate quantities of the various ingredients desired. The operator's skill is em-employed to determine when the proper amount of grinding, milling and mixing has been done. At such time the entire mass is removed from the rolls and used in manufacturing, additional batches being made up as necessary. Continuous methods have also been developed so that masticated and milled rubber compounds can be withdrawn continuously from a pair or bank of mixing and masticating mill rolls. But continuous mixing methods and machines present numerous difficulties which arise, chiefly by reason of the inherent stiffness, toughness and tackiness of the rubber materials being compounded. Additional materials to be mixed with the rubber are frequently in powder or liquid form, which makes it extremely difficult to obtain a uniform and homogeneous mixture.

It is therefore the principal object of the present invention to provide an improved mixing or compounding apparatus which will largely overcome the difficulties pointed out above and which will result in the continuous supply of a uniform, homogeneous mixed product. The apparatus of the present invention is particularly suited to the milling process described and claimed in my copending application for patent Serial No. 671,684, filed May 23, 1946, for Method for Mixing Rubber and the Like, now Patent No. 2,540,195, issued February 6, 1951, of which this case is a division.

Another object is to provide an improved apparatus for mixing rubber compounds and the like which can be adapted to existing milling equipment.

Figure 2:
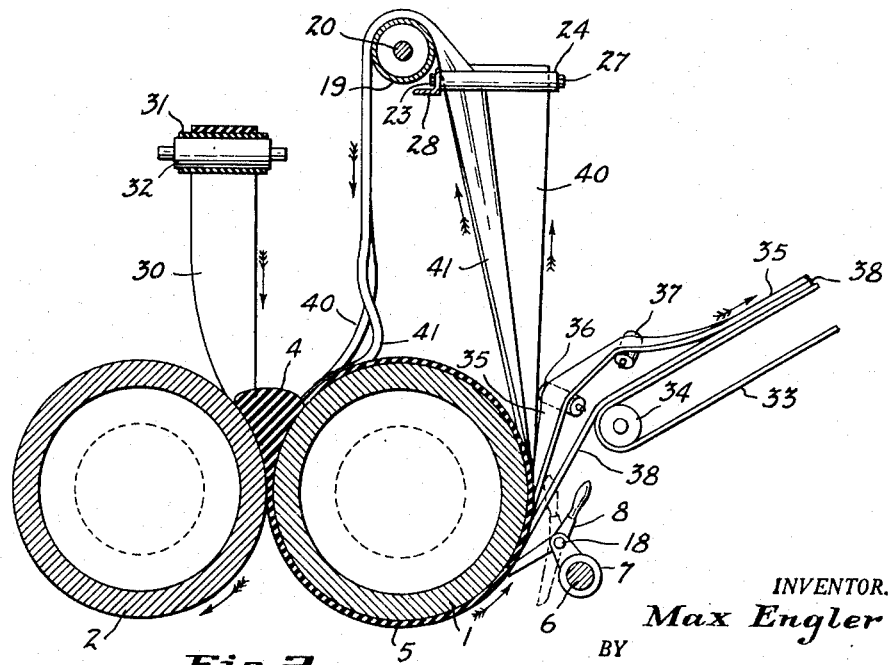

A further object is to provide milling apparatus which is readily adjusted or altered to meet different requirements of mixing and compounding. A still further object of the invention is to provide an improved apparatus for milling rubber compounds and the like which is simple in design and construction. Other objects and advantages will become apparent from the following detailed description of a suitable embodiment of the apparatus contemplated. Such apparatus is diagrammatically illustrated in the accompanying drawings in which:

Fig. 1 is a front elevational view of the apparatus, partly diagrammatic and with parts broken away or removed; and Fig. 2 is a sectional view of the apparatus taken substantially on the line 2—2 of Fig. 1.

Referring now to the drawings by numerals of reference, which indicate like parts throughout the several views, the apparatus includes a pair of mill rolls 1 and 2 mounted in side by side parallel relation for rotation about horizontal axes. These mill rolls are of conventional construction and may be carried by suitable trunnions or journals 3 rotatable in bearings of frames not shown. A quantity of rubber or rubber-like material 4 to be mixed or milled is carried in the upper bite of the mill rolls 1 and 2 and is retained by gravity and the action of the mill rolls in drawing the rubber material into the bite and between the rolls. Rotation of the rolls by suitable drive mechanism is in the direction of the arrows (Fig. 2) which causes the rubber material to be formed into a relatively thin sheet 5 adhering to the roll 1. One of the mill rolls, for example the mill roll 1, may be heated as by steam.

Adjacent the mill roll 1 and extending in parallel relation to the surface of such roll is a cutter bar 6. Mounted on and slidable along the cutter bar 6 are a number of holders 7 each of which can be secured in any desired position on the bar by means such as clamps or set screws not shown. Knives 8, 9, 10, 11, 12, 15, 16 and 17 are carried by pivots 18 on the holders 7 so that the knives can be swung into and out of engagement with the rubber sheet 5 on the drum 1. In Fig. 2 the broken lines indicate the position of the knife 8 when inactive, and the full lines show the knife bearing against the drum 1 so as to sever the advancing rubber sheet 5 as the drum rotates. The knives are retained in operative position by the pressure of the on-coming rubber sheet or, if desired, by springs not shown.

Mounted above the mill rolls is a driven roller 19 for supporting a ribbon or ribbons of sheet rubber looped thereover from the mill rolls. This driven roller is preferably of considerably less diameter than either of the mill rolls, being in diameter approximately one-fourth to one-third the diameter of the mill roll 1. While the diameter of the driven roller is not critical it is necessary that it be of sufficiently large diameter to afford enough surface so that in rotating it draws the rubber ribbon or ribbons off the mill roll by frictional engagement with the rubber.

The roller 19 is fixed on a shaft 20 rotatably mounted in suitable journals not shown. A sprocket 21 secured on one end of the shaft 20 is driven by means of a chain 22 from a suitable source of power such as an electric motor or the drive for the mill rolls. Preferably the roller 19 is thus driven at a peripheral speed slightly greater than that of the mill roll 1, but at a speed at least as great as the speed of such mill roll, so that it acts to draw the looped ribbon or ribbons of rubber off the mill roll and such ribbon or ribbons of rubber may then drape or hang off the driven roller as they are fed back to the mill rolls.

The driven roller is parallel to the mill roll 1 and located so that rubber ribbons draped over the driven roller fall or move by gravity so as to engage the downwardly moving top surface of the mill roll 1; that is, slightly in the direction of movement of the roll from the uppermost portion of the roll. Each rubber ribbon draped over the driven roller is tensioned as it is drawn from the mill roll, by frictional engagement with the driven roller which rotates faster than the mill roll, and after moving over the driven roller the ribbon is permitted to release or justify itself as it hangs free, tensioned only by its own weight in moving from the driven roller back to the bite of the mill rolls for further mixing and masticating. While the spacing between the driven roller 19 and the mill roll 1 is not critical, it has been found desirable for a spacing several times the diameter of the driven roller to be provided. Such relatively wide spacing of the driven roller from the mill rolls affords a long span or reach for the loops of the rubber ribbons carried over the driven roller, thus accommodating a large amount of rubber and facilitating the shifting of the rubber from one position on the mill to another.

Guide rollers 24, 25 and 26 are provided adjacent the driven roller 19 to engage and twist the rubber ribbons looped over the driven roller and to hold the ribbons in desired relative positions. Each of the guide rolls is rotatably mounted on a shaft 27 which is detachably secured to a support 28. This support may be in the form of an angle bar disposed just below and to one side of the driven roller 19 and carried by suitable frame work not shown which may also be utilized to support the driven roller 19. The support 28 is parallel to the driven roller and is formed with a number of spaced openings 29 in which the ends of the shafts 27 are received and secured as by nuts 23 screwed onto reduced and threaded end portions of the shafts. Each of the guide rollers 24, 25 and 26 is thus supported cantilever fashion and may be shifted to various positions along the length of the support 28, and additional guide rollers of the same character may be supplied, for holding and guiding the rubber ribbons as desired. The guide rollers may be mounted on the shafts 27 by means of ball or roller bearings so that they are freely rotatable and offer a minimum of restraint to the rubber moving thereover.

The present invention, being directed primarily to the continuous milling and masticating of rubber and rubber-like products, it is desirable to feed the raw or incompletely milled rubber material in a continuous manner to the mass 4 carried in the upper bite of the mill rolls. The supply may be in the form of a continuous strip 30 which is carried to the mill by an endless conveyor belt 31 mounted on rotatable elements one of which is indicated at 32. The fresh rubber thus moves to a position over the bite of the rolls 1 and 2 at the left hand end as viewed in Fig. 1. This left hand end is termed the "in-feed" end of the mill rolls since in the mixing and masticating of the rubber-like material the latter is moved from the left to the right. In certain instances it may be desirable to add rubber and compounding materials such as plasticizers, extenders, accelerators and pigments directly to the mill in more or less intermittent manner, as by hand. In such case, the materials are deposited in the bite of the rolls at the "left hand" or in-feed end.

The completely milled and masticated rubber material is withdrawn from the right hand end of the apparatus as viewed in Fig. 1 by means of a driven endless belt conveyor 33 mounted on rotatable elements one of which is indicated at 34. While the rubber may be removed in the form of a single strip, it is preferable in certain instances to cut a plurality of strips from the material sheeted out between the mill rolls 1 and 2 and superimpose such strips one on top of another, the composite strip thus formed being drawn away over the conveyor belt 33. For example, a continuous strip or ribbon 35 of the rubber material is cut from the sheet 5 by knives 12 and 15. This strip or ribbon is carried over guides 36 and 37 which shift the strip laterally or to the right as viewed in Fig. 1 and superimpose it on a strip 38 cut from the sheeted rubber by knives 16 and 17, the latter sheet moving directly onto the conveyor belt 33 from the mill roll. The guides 36 and 37 may be rollers rotatably mounted on suitable supports. The composite strip comprising the strips 35 and 38 thus move on for use together and have been found to be more satisfactory than a single strip of equal thickness cut from the mill rolls in a single operation. The finer milling permitted by the arrangement herein described results in a more homogeneous mixture having improved physical properties. More than two strips may, of course, be simultaneously cut from the sheeted rubber and superimposed in the same manner.

It is extremely desirable that the strips 35 and 38 furnished by the milling apparatus be uniform in consistency and relatively free of voids, bubbles, cracks and the like, so that the operation of machinery and apparatus which is to handle the product in subsequent operations may be as uniform as possible. Such machinery may be extruding machines, cutters or mills for further compounding. To provide an assured supply of rubber material at the right hand or out-feed end of the mill rolls, as viewed in Fig. 1, as well as to effect certain advantages in mixing and milling, the cutters 10 and 11 are disposed to sever a ribbon or strip 40 from the central portion of the sheeted rubber carried by the mill roll 1. The ribbon 40 is carried in a loop over the driven roller 19 and the downwardly moving run thereof hangs free from the discharge side of the driven roller, dropping onto the downwardly moving upper surface of the mill roll 1 as the rubber is lowered by the rotation of the driven roller 19. The ribbon 40 is trained over the guide roll 25 and under the guide roll 26, which twist the ribbon into a horizontal plane and carry the same in a horizontal direction axially of the mill so that the strip or ribbon depends from adjacent the right end of the driven roller 19 and drops into the mill at the right hand or discharge end of the latter.

Adjacent the in-feed end of the mill the cutters 8 and 9 sever a continuous strip 41 from the rubber sheet 5 and this ribbon or strip is carried upwardly and looped over the driven roller 19. The guide roll 24 twists the ribbon or strip 41 so that it is disposed at an angle to the driven roller 19 and the action of the driven roller 19 in drawing the ribbon strip is to compact the latter edgewise. The portion or run of the strip depending from the driven roller 19 is narrower than the ascending run and is deposited on the downwardly moving upper surface of the mill roll 1 adjacent the in-feed end of the mill.

The circuitous path over which the rubber or strip 40 is carried effects a relative delay in the time that the material in the strip 40 is returned to the mill rolls with respect to the time that the rubber of the strip 41 is returned. In this manner a more thorough mixing and commingling of the ingredients or compounding materials is effected. Additionally a relatively large supply of rubber material is carried in the strips 40 and 41 which serves to stabilize and level out fluctuations in the feed schedule of the raw or supply rubber materials being fed to the apparatus. Hence the mass or bank 4 of rubber carried in the upper bite of the rolls can be held to a minimum. It appears that, by keeping a small working mass or bank of rubber on the mill, a more thorough and complete mixing is possible than would be true if all of the rubber being worked were carried in the bite of the rolls.

The rubber strips or ribbons being drawn over the roller 19 are twisted into planes substantially normal to the rotational axis of the roller by the guide rolls 24, 25 and 26 and a compacting or kneading action takes place which tends to distribute the materials being mixed in a thorough manner and also to narrow the strips or ribbons.

While the bank or mass 4 of the rubber being compounded may distribute itself along the entire length of the mill rolls 1 and 2, it frequently occurs that a number of well recognizable zones or masses will prevail when the mill is operated in the arrangement described above. One mass or mound 4a (Fig. 1) is customarily formed by the incoming supply strip 30. A second mound or mass 4b may be formed by the looped ribbon 41, and a third mound or mass 4c may be formed by the looped ribbon 40. In normal operation the mounds or masses 4a, 4b and 4c are blended and joined together at their ends in the continuous strip or sheet 5. This is deemed to be the most desirable mode of operation, the rubber materials in the several masses moving outwardly from the same axially along the rolls to feed in a secondary manner those portions of the mill rolls not being fed in a primary manner by fresh materials or material carried in the loops over the driven roller 19. It is conceivable, however, that under certain conditions of operation such as when the quantity of rubber carried by the apparatus is relatively small, the rubber sheet 5 will be discontinuous across the length of the mill roll 1 and the mounds or masses 4a, 4b and 4c will be separate and distinct from one another. Whether the several banks or mounds of rubber being mixed are separate or joined together, it appears that there is a progressive movement of the rubber being compounded and masticated from the left to the right of the mill, as viewed in Fig. 1. The rubber material in the ribbon or loop 41 comprises primarily that sheeted out from the bank or mass 4a, the ribbon or strip 40 comprises primarily the rubber sheeted out from the bank or mass 4b and the rubber in the strips 35 and 38 comprises primarily that sheeted out from the bank 4c. There is some translation of the rubber material along the surface of the mill roll 1 effected by the pressure of the rolls and the mass or masses of rubber in adjacent banks. The relative quantity of rubber thus shifted along the surface of the mill roll by lateral pressure is controlled by movement of the knives on the cutter bar 6. For example, if the knives 8 and 9 are disposed relatively close together, the ribbon or loop 41 will be insufficient to supply the mound or mass 4b from which the strip or loop 40 is sheeted. Hence the rubber going into that portion of the sheet 5 from which the strip 40 is cut will be drawn from the mass or bank 4a by a lateral shifting or translation along the surface of the mill roll 1. Some of the rubber going into the strip or ribbon 40 might likewise be drawn from the mass or bank 4c which will thus move in retrogression or to the left as viewed in Fig. 1. Various positions of the cutter knives may be selected to obtain any desired compounding or commingling of the rubber materials being masticated. In certain cases it may be desirable to have more than two loops or ribbons carried over the driven roller 19.

The principles of the present invention may be utilized in various ways, numerous modifications and alterations being contemplated, substitution of parts and changes in construction being resorted to as desired, it being understood that the embodiment shown and described and the particular procedure set forth are presented for purposes of explanation and illustration without intending to limit the scope of the claim to the specific details disclosed.

What I claim is:

In combination in rubber milling apparatus a pair of driven mill rolls for sheeting rubber and the like, a driven roller and means mounting the roller in spaced relation above the mill rolls, a support member adjacent and substantially paralleling the roller, guide rollers mounted in spaced relation along the length of the support member, a plurality of cutters and means mounting the cutters to operate on a rubber sheet carried by one of the mill rolls to divide such sheet into a plurality of ribbons so that a plurality of the rubber ribbons can be withdrawn from said one mill roll, looped over the driven roller, engaged by the guide rollers so as to be constrained to predetermined separate paths and separately returned to the rolls at points spaced axially along the rolls from the points of withdrawal, an endless driven conveyor having one end disposed adjacent one of the mill rolls so that other rubber ribbons can be led onto the conveyor for withdrawal in unison from said last mentioned mill roll, and guide means for engaging one of said other ribbons intermediate the one mill roll and the conveyor to support said one ribbon and to guide it into super-imposed contacting relation to another of said other ribbons, the one rubber ribbon being thereby supported to contact the other rubber ribbon initially at a point beyond the point of initial contact of such other ribbon and the conveyor.

MAX ENGLER.

REFERENCES CITED

The following references are of record in the file of this patent:

UNITED STATES PATENTS

| Number | Name | Date |
|---|---|---|
| 1,402,160 | Gwozdz | Jan. 3, 1922 |
| 1,850,450 | Denmire | Mar. 22, 1932 |
| 1,897,961 | Snyder | Feb. 14, 1933 |
| 1,963,503 | Quinton | June 19, 1934 |
| 2,011,685 | Maynard | Aug. 20, 1935 |